United States Patent [19]
Yamaguchi

[11] Patent Number: 5,117,193
[45] Date of Patent: May 26, 1992

[54] DROP-OUT DETECTION CIRCUIT

[75] Inventor: Hirohisa Yamaguchi, Tokyo, Japan

[73] Assignee: TEAC Corporation, Japan

[21] Appl. No.: 585,600

[22] Filed: Sep. 20, 1990

[30] Foreign Application Priority Data

Sep. 25, 1989 [JP] Japan ................... 1-248859

[51] Int. Cl.⁵ .............................................. H04N 5/78
[52] U.S. Cl. ................... 328/120; 307/234; 328/112; 360/38.1
[58] Field of Search ................... 369/53; 360/38.1; 358/314; 307/234, 273; 328/120, 207, 112

[56] References Cited

U.S. PATENT DOCUMENTS 3,947,873  3/1976  Buchan .................. 360/38.1

FOREIGN PATENT DOCUMENTS 245571  10/1987  Japan .................. 307/273

OTHER PUBLICATIONS

Ball et al., "Design Focus" May 15, 1979 p. 51.

Primary Examiner—Stanley D. Miller
Assistant Examiner—Sinh N. Tran
Attorney, Agent, or Firm—Andrus, Sceales, Starke & Sawall

[57] ABSTRACT

A drop-out detection circuit which supplies an output signal indicative of a drop-out within information reproduced from a storage medium, when a rectangular wave signal produced from a modulated signal carrying the reproduced information does not supply a trigger pulse within a prescribed pulse duration. The drop-out detection circuit comprises a first pulse generation part for supplying a first pulse signal having a low level for a prescribed pulse duration when the rectangular wave signal changes from a low level to a high level, a second pulse generation part for supplying a second pulse signal having a low level for the prescribed pulse duration when the rectangular wave signal changes from the high level to the low level, and a logic gate for outputting the output signal having a high-level pulse supplied only when the first pulse signal and the second pulse signal both having the high level is supplied for a time period exceeding the prescribed pulse duration. The drop-out detection circuit can detect the drop-out within the reproduced information accurately, without being affected by a change in the ambient temperature and a fluctuation of the frequency of the modulated signal.

6 Claims, 2 Drawing Sheets

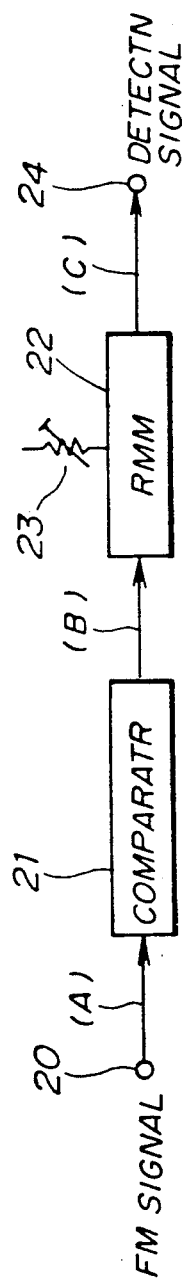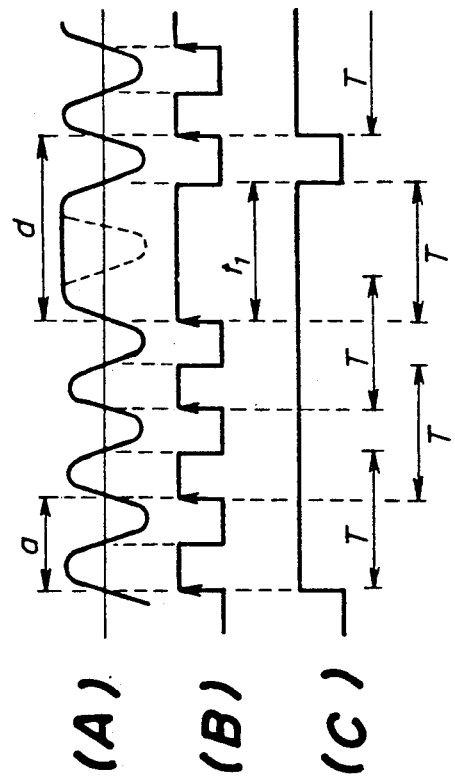
FIG. 1 PRIOR ART
FIG. 2 PRIOR ART

DROP-OUT DETECTION CIRCUIT

BACKGROUND OF THE INVENTION

The present invention generally relates to drop-out detection circuits, and more particularly to a drop-out detection circuit which detects a missing part of a record signal.

Conventionally, a storage medium like a magneto-optic disk on which a prescribed data is stored sometimes has a flaw or foreign matter on a surface thereof. In such a case, a record signal reproduced from the storage medium shows a voltage level below a prescribed level instantaneously at a portion of the storage medium where the flaw or foreign matter exists, and a part of the recorded data corresponding to that portion of the storage medium is lost. This kind of problem which arises primarily when the recorded data is produced is called hereinafter a drop-out. Once this drop-out is accurately detected within the record signal reproduced from the storage medium, it is possible to substitute a pseudo-signal for the missing part of the record signal corresponding to the drop-out detected to maintain the continuity of the recorded data.

FIG. 1 shows an example of a conventional drop-out detection circuit. In FIG. 1, a modulated signal such as a frequency modulated signal (FM signal) is supplied to an input terminal 20 of this conventional drop-out detection circuit. This modulated signal has a waveform as shown in FIG. 2A, and a voltage of the modulated signal is compared with a reference voltage by a comparator 21 to supply a rectangular wave signal as indicated in FIG. 2B. As shown in FIG. 2B, the rectangular wave signal changes from a low level to a high level when the modulated signal crosses a zero level from a negative region to a positive region, and the rectangular wave signal returns from the high level back to the low level when the modulated signal crosses the zero level from the positive region to the negative region. This rectangular wave signal is supplied from the comparator 21 to a retrigger monostable multivibrator (RMM) 22, and this RMM 22 outputs a pulse signal, as shown in FIG. 2C, to an output terminal 24. This pulse signal is supplied through overlapping of pulses which are generated from the RMM 22 at rise points (where a zero crossing from negative level to positive level occurs) of the above rectangular wave signal supplied from the comparator 21. As can be seen from FIG. 2C, the pulse signal outputted from the RMM 22 is maintained in a metastable state (high level) when a pulse is supplied from the comparator 21 to the RMM 22 within a predetermined time period that is based on a time duration T of a pulse signal outputted from the RMM 22, and this time duration of the pulse signal is set up with a variable resistor 23 that is connected to a terminal of the RMM 22. However, the above pulse signal outputted from the RMM 22 returns to a low level when a pulse within the rectangular wave signal is not supplied to the RMM 22 within the prescribed pulse duration T. When the modulated signal outputted to the comparator 21 has a drop-out which may cause the loss of a few pulses within the modulated signal as indicated by a dotted line in FIG. 2A, the comparator 21 does not supply a pulse of the rectangular wave signal corresponding to the lost pulses of the modulated signal to the RMM 22 within the prescribed pulse duration T, and a time longer than the prescribed pulse duration elapses until the following pulse of the rectangular wave signal is supplied from the comparator 21 to the RMM 22. Then, a negative pulse of the pulse signal, as shown in FIG. 2C, is supplied from the RMM 22 to the output terminal 24, and this negative pulse constitutes a major part of the drop-out detection signal that is supplied by the conventional drop-out detection circuit.

When this conventional drop-out detection circuit is used, it is necessary that the pulse duration T of the pulse signal supplied from the RMM 22 be represented by the formula $a<T<d$ (where "a" denotes one period of the modulated signal, and "d" denotes a time period of the lost part of the modulated signal). With the pulse duration T satisfying the formula above, it is possible to detect any lost pulse within the inputted modulated signal due to the drop-out for one pulse duration of the modulated signal. If the variable resistor 23 is adjusted to have a resistance which allows the formula above to be satisfied, the conventional drop-out detection circuit can detect a lost part of the modulated signal as the result of the pulse signal with the low level being outputted as a drop-out detection signal from the RMM 22 to the output terminal 24.

However, in the conventional drop-out detection circuit, when a temperature around the circuit changes greatly, the pulse duration T of the pulse signal outputted from the RMM 22 varies significantly. And, the frequency of the frequency modulated signal inputted to the input terminal 20 often fluctuates. This fluctuation of the frequency of the FM signal is, for example, about 25% in a range between 5.2 MHz and 6.7 MHz and about 20% in a range between 8 MHz and 10 MHz. Therefore, in the case of the conventional drop-out detection signal suffering a change in ambient temperature or a fluctuation of the frequency, it is difficult to preset an appropriate pulse duration T of the pulse signal outputted from the retrigger monostable multivibrator which is represented by the formula: $a<T<d$, as described above.

SUMMARY OF THE INVENTION

Accordingly, it is a general object of the present invention to provide a novel and useful drop-out detection circuit in which the above described problems are eliminated.

Another and more specific object of the present invention is to provide a drop-out detection circuit which comprises a first pulse generation part for supplying a first pulse signal having a low level for a prescribed pulse duration when a rectangular wave signal produced from a modulated signal carrying information reproduced from a storage medium changes from a low level to a high level, a second pulse generation part for supplying a second pulse signal having a low level for the prescribed pulse duration when the rectangular wave signal changes from the high level to the low level, and a logic gate for supplying an output signal having a high level, the output signal changing from a low level to the high level when the first pulse generation part supplies the first pulse signal with the high level to the logic gate and the second pulse generation part supplies the second pulse signal with the high level to the logic gate, the output signal having the low level when at least either the first pulse signal or the second pulse signal supplied to the logic gate has the low level within the prescribed pulse duration. According to the present invention, it is possible to detect accurately a drop-out detection signal without being affected by a change in the ambient temperature and a fluctuation of the frequency of the record signal. Also, the generation of the first output pulse from the rise point of the rectangular wave signal and that of the second output pulse from the fall point thereof allow a speedy detection of the drop-out within the reproduced information.

Still another object of the present invention is to provide a drop-out detection circuit which comprises a pulse generation part for generating an output signal indicative of a drop-out within a recorded data from a storage medium when a rectangular wave signal produced from a modulated signal carrying the recorded data does not supply a trigger pulse continuously for a time period exceeding a prescribed pulse duration of the output signal, and a pulse feedback part for feeding the output signal outputted from the pulse generation part back to a terminal of the pulse generation part to maintain the prescribed duty factor of the output signal. According to the present invention, it is possible to make the duty factor of the drop-out detection signal constant at all times. The drop-out detection signal is not significantly affected by a change in ambient temperature or by a fluctuation of the frequency of the modulated signal, so that the pulse duration of the output signal from the pulse generation part is maintained to be always an appropriate value. Thus, there is no need to previously adjust the pulse duration of the output signal.

Other objects and further features of the present invention will become apparent from the following detailed description when read in conjunction with the accompanying drawings.

BRIEF DESCRIPTION OF THE DRAWINGS

FIG. 1 is a block diagram of a conventional drop-out detection circuit;

FIGS. 2A through 2C are timing charts for explaining the operation of the conventional drop-out detection circuit shown in FIG. 1;

DESCRIPTION OF THE PREFERRED EMBODIMENT

Figure 3:
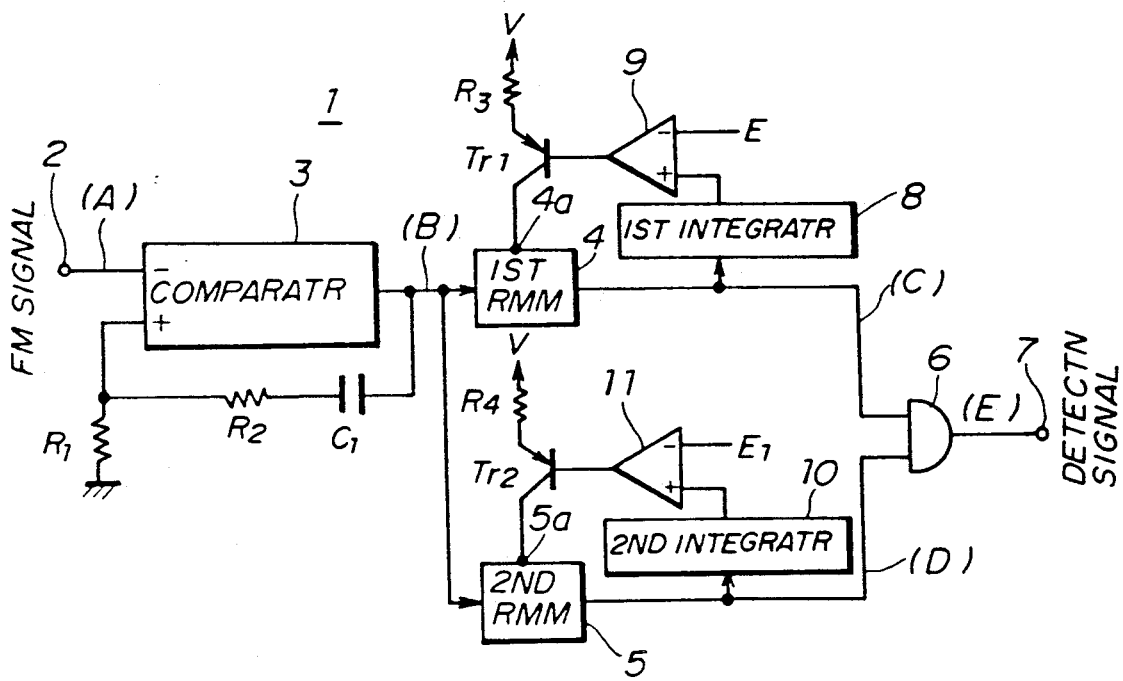
FIG. 3 is a block diagram of an embodiment of a drop-out detection circuit according to the present invention.

Referring now to FIG. 3, a description will be given of an embodiment of a drop-out detection circuit according to the present invention. In FIG. 3, a drop-out detection circuit 1 generally has an input terminal 2, an input comparator 3, a first pulse generation part 4, a second pulse generation part 5, an AND gate circuit 6, an output terminal 7, a first integrator 8, a first comparator 9, a second integrator 10 and a second comparator 11. The first and second pulse generation parts are built usually with a retrigger monostable multivibrator (RMM). A modulated signal carrying a recorded data reproduced from an information storage medium (not shown) which is, for example, a frequency modulated signal (FM signal), is inputted to an inversion input terminal of the input comparator 3 (which terminal is indicated by a minus symbol "−" in FIG. 3) through the input terminal 2. A non-inversion input terminal of the input comparator 3 (which terminal is indicated by a plus symbol "+" in FIG. 3) is grounded via a first resistor R1, and this non-inversion input terminal and an output terminal of the input comparator 3 are connected through a second resistor R2 and a capacitor C1. The second resistor R2 and the capacitor C1 constitute a feedback circuit for the comparator 3. A signal outputted from the input comparator 3 is fed back to the non-inversion terminal of the input comparator 3 through this feedback circuit, and is supplied to the first pulse generation part (RMM) 4 and to the second pulse generation part (RMM) 5. The first pulse generation part 4 generates a first output pulse at a timing corresponding to a rise point of the signal supplied thereto (where the signal crosses zero from the negative region to the positive region), and the second pulse generation part 5 generates a second pulse at a timing corresponding to a fall point of the signal supplied thereto (where the signal crosses zero from the positive region to the negative region). The first output pulse from the RMM 4 and the second output pulse from the RMM 5 are supplied to the AND gate 6, and the AND gate 6 supplies a drop-out detection signal to the output terminal 7 of the drop-out detection circuit.

The first output pulse from the first pulse generation part 4 is inputted to a non-inversion input terminal of the first comparator 9 through the first integrator 8, and a voltage of this first output pulse is compared by the first comparator 9 with a reference voltage E1 supplied to an inversion input terminal of the first comparator 9. A signal outputted from the first comparator 9 is used to control a collector current of a first transistor Tr1, and a control signal is supplied from a voltage source V to a pulse duration setting terminal 4a of the RMM 4 through a third resistor R3 connected to the voltage source V. The first integrator 8 and the first comparator 9 constitute a first feedback circuit for adjusting the pulse duration T of the first output pulse supplied from the first pulse generation part 4 to the AND gate 6 so that a duty cycle of the first output pulse is maintained at a predetermined constant level, as described below. Similarly, as shown in FIG. 3, the second output pulse supplied from the second pulse generation part 5 is inputted to a non-inversion input terminal of the second comparator 11 through the second integrator 10, and a voltage of this second output pulse is compared by the second comparator 11 with the reference voltage E1 supplied to an inversion input terminal of the second comparator 11. A signal outputted from the second comparator 11 is used to control a collector current of a second transistor Tr2, and a control signal is supplied from the voltage source V to a pulse duration setting terminal 5a of the RMM 5 through a fourth resistor R4 connected to the voltage source V. The second integrator 10 and the second comparator 11 constitute a second feedback means for adjusting the pulse duration T of the second output pulse supplied from the second pulse generation part 5 to the AND gate 6 so that a duty factor of the second output pulse is maintained at a predetermined constant level, as described below.

Figure 4:
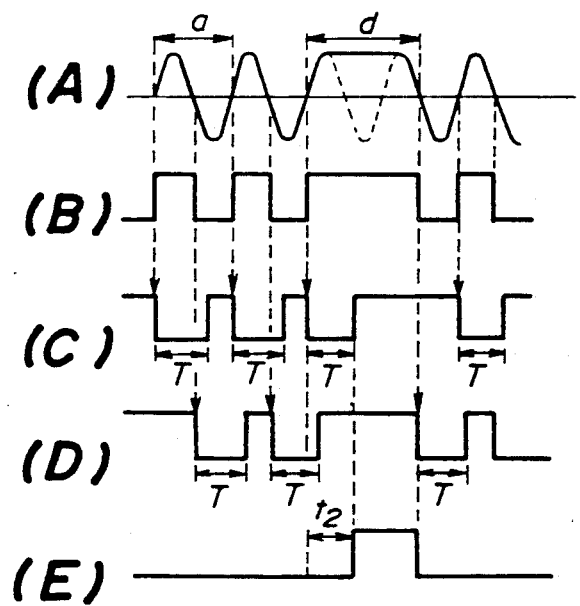
FIGS. 4A through 4E are timing charts for explaining the operation of the drop-out detection circuit shown in FIG. 3.

Next, a description will be given of the operation of the drop-out detection circuit 1 according to the present invention, with reference to FIGS. 4A through 4E. FIG. 4A shows the waveform of the modulated signal (FM signal) A having a signal period "a" inputted to the input comparator 3 through the input terminal 2, and this modulated signal A carries a recorded data stored on an information storage medium (not shown) and includes a lost part of the signal waveform with a duration "d", as indicated by a dotted line in FIG. 4A. Shaping of the waveform of the FM signal A is made by the input comparator 3 through detection of the zero crossings of the modulated signal A, so that a rectangular wave signal B is supplied from the comparator 3 to the RMM 4 as well as to the RMM 5. FIG. 4B shows the waveform of the rectangular wave signal B thus supplied to the RMM 4 and to the RMM 5. The rectangular wave signal supplied from the input comparator 3 is fed back to the non-inversion terminal of the input comparator 3 through the feedback circuit having the capacitor C1 and the second resistor R2. This feedback circuit serves to prevent the input comparator 3 from detecting the zero crossings of the first output pulse and the second output pulse when a portion of the lost pulses indicated by "d" in FIG. 4A approaches the zero level significantly. This feedback circuit is provided for the input comparator 3 for adding an additional voltage value corresponding to a hysteresis loss to a rise threshold value and to a fall threshold value in order not to perform the detection of the zero crossings when such a portion of the lost pulses approaches the zero level significantly. Therefore, it is possible for the present drop-out detection circuit to detect a drop-out within the record signal reliably even when the portion of the lost pulses goes near the zero level.

Next, the rectangular wave signal outputted from the input comparator 3, as shown in FIG. 4B, triggers the RMM 4 and the RMM 5. The RMM 4 supplies the first pulse signal (low level) having a pulse duration T when the rectangular wave signal changes from a low level to a high level, as shown in FIG. 4C, while the RMM 5 supplies the second pulse signal (low level) having the same pulse duration T when the rectangular wave signal changes from the high level to the low level, as shown in FIG. 4D. The pulse durations T of the first and second pulse signals are each adjustable with a voltage being applied to the pulse duration setting terminal 4a of the RMM 4 and a voltage being applied to the pulse duration setting terminal 5a of the RMM 5, and each of these voltages is supplied through a feedback circuit having an integrator and a comparator as described below. However, the present invention is not limited to such a feedback circuit, and a variable resistor as shown in the conventional drop-out detection circuit in FIG. 1 may be used to adjust a voltage applied to the pulse generation part. It should be noted that the pulse durations T of the first pulse signal and the second pulse signal in the present invention are represented by a different formula: $0.5\ a < T < d\ (=1.5\ a)$, where "a" denotes a time duration equal to one period of the modulated signal A, and "d" denotes a time duration of the lost part of the modulated signal A produced due to a drop-out within the record signal reproduced from the storage medium. Then, the first pulse signal from the RMM 4 and the second pulse signal from the RMM 5 are supplied concurrently to the input terminals of the AND gate 6, respectively. And the AND gate 6 supplies a drop-out detection signal E, as indicated in FIG. 4E, to the output terminal 7, the drop-out detection signal E corresponding to the lost part of the modulated signal A described above.

When the modulated signal A is normal and has no lost part and the first pulse signal C (low level) and the second pulse signal D (low level) have the same pulse duration T as represented by the above described formula concerning the present invention, no drop-out detection signal having the high level is supplied from the AND gate 6 to the output terminal 7. The signal E supplied from the AND gate 6 continues to have the low level. For, in this case, the first pulse signal having the low level and the second pulse signal having the low level overlap each other only partially, but the first pulse signal C and the second pulse signal D show a level different from each other for a time period smaller than the pulse duration T predetermined from the above formula concerning the present invention. When the modulated signal A has a lost part that is caused by a drop-out within the record signal as indicated by "d" in FIG. 4A, both the first pulse signal C and the second pulse signal D continue to have the high level for a time period exceeding the predetermined pulse duration T, and the first pulse signal and the second pulse signal do not change from the high level to the low level within the predetermined pulse duration T. The signal E supplied from the AND gate 6 then changes from the low level to the high level, and goes on having the high level until at least either the first pulse signal or the second pulse signal has the low level. Thus, the drop-out detection signal having the high level is supplied from the AND gate 6 to the output terminal 7.

The drop-out detection circuit according to the present invention can detect a drop-out within the record signal from the storage medium using the first pulse signal with the pulse duration T from the first pulse generation part 4 and the second pulse signal with the same pulse duration T from the second pulse generation part 5. Therefore, the drop-out detection circuit according to the present invention is not greatly affected by a change in the ambient temperature and a fluctuation of the frequency of the modulated signal inputted, and the pulse duration T for the first pulse signal E and that for the second pulse signal D can be adjusted appropriately and the detection of a drop-out within the record signal can be made reliably. And, a time t2 that is required for the drop-out detection circuit of this embodiment to supply the drop-out detection signal following the occurring of the drop-out in the record signal is, as indicated in FIG. 4E, smaller than a time t1 required for the conventional drop-out detection circuit to supply the drop-out detection signal after the drop-out occurs in the record signal as shown in FIG. 2. Therefore, it is possible for the present drop-out detection circuit to perform a speedy detection of a drop-out within the record signal which may take place. In addition, the pulse duration T with respect to a pulse signal supplied from a pulse generation part (RMM) in the case of the present invention, as shown in FIGS. 4C and 4D, can be made smaller than that in the case of the conventional drop-out detection circuit as indicated in FIG. 2C. In fact, the pulse duration T shown in FIGS. 4C and 4D is equal to approximately a half of the pulse duration T of the conventional drop-out detection circuit shown in FIG. 2C. Hence, the ability of the drop-out detection circuit to detect the drop-out is greater than that of the conventional drop-out detection circuit, and a drop-out, due to the pulse signals with a smaller pulse duration, which cannot be detected by the conventional drop-out detection circuit may be detected by the drop-out detection circuit according to the present invention.

Next, a description will be given of the feedback circuit which is provided at both the first pulse generation part 4 and the second pulse generation part 5. A first feedback circuit comprises a first integrator 8 for smoothening the first pulse signal supplied from the RMM 4 and a first comparator 9 for comparing a voltage of the first pulse signal thus smoothened with a reference voltage E1 to supply a first control signal to the pulse duration setting terminal of the RMM 4. Similarly, a second feedback circuit comprises a second integrator 10 for smoothening the second pulse signal supplied from the RMM 5 and a second comparator 11 for comparing a voltage of the second pulse signal thus smoothened with a reference voltage E1 to supply a second control signal to the pulse duration setting terminal of the RMM 5. For example, a case will be considered in which the reference voltage E1 is preset to a voltage equal to one fourth of the high level voltage of the first pulse signal, and the duty factor of the first pulse signal from the RMM 4 is preset to ¼ (a ratio of high level time within a duty cycle to total duty cycle time). In this case, when the first pulse signal from the RMM 4 changes from low level to high level and a voltage of the first pulse signal exceeds the reference voltage E1, the output voltage of the comparator 9 becomes lower and a collector current of the transistor Tr1 decreases, thus delaying the charging of a capacitor (not shown) within the RMM 4 to thus change the first pulse signal from high level to low level within the pulse duration T. In other words, the duty factor of the first pulse signal C from the RMM 4 is determined by the integrator 8. When the duty factor of the first pulse signal C is smaller than ¼ (for example, it is equal to 1/5), the reference voltage E1 is higher than the voltage of the first pulse signal C, and the output voltage of the comparator 9 increases. As the collector current of the first transistor Tr1 becomes greater, the duty factor of the first pulse signal C increases and will return to ¼. In contrast, when the duty factor of the first pulse signal C is greater than ¼ (for example, it is equal to ⅓), the reference voltage E1 is lower than the voltage of the first pulse signal C, and the output voltage of the comparator 9 decreases. As the collector current of the transistor Tr1 decreases, the duty factor of the first pulse signal C decreases and will return to ¼. The same discussion is applicable to the case of the second feedback circuit for the retrigger monostable multivibrator (RMM) 5.

In the foregoing embodiment, the first and second feedback circuits are provided for the first pulse generation part 4 and the second pulse generation part 5. However, the present invention is not limited to this embodiment. It is also possible to provide a drop-out detection circuit which has a single pulse generation part for supplying an output signal indicative of a drop-out within the record signal, and a single feedback circuit for feeding the output signal supplied from the pulse generation part back to a terminal of the pulse generation part to maintain the prescribed duty factor of the output signal at a given constant level. And, in the above described embodiment, the input comparator 3 is provided with the feedback circuit, and the first pulse generation part and the second pulse generation part respectively are provided with the first feedback circuit and the second feedback circuit. It is possible to provide only the single pulse generation part with the single feedback circuit, so that an effect different from the effect described above may be achieved. As described above, the constant duty factors of output signals from the RMM 4 and the RMM 5 owing to the provision of the first and second feedback circuits will facilitate the adjustment of the pulse duration T to an appropriate value.

Further, the present invention is not limited to the above described embodiment, and variations and modifications may be made without departing from the scope of the present invention.

What is claimed is:

1. A drop-out detection circuit which supplies an output signal indicative of a drop-out within information reproduced from a storage medium when a rectangular wave signal produced from a modulated signal carrying the information reproduced from the storage medium does not supply a trigger pulse within a prescribed pulse duration, said drop-out detection circuit comprising:

first pulse generation means for supplying a first pulse signal having a low level for a prescribed pulse duration when the rectangular wave signal changes from a low level to a high level;

second pulse generation means for supplying a second pulse signal having a low level for the prescribed pulse duration when the rectangular wave signal changes from the high level to the low level; and logic gate means for supplying the output signal indicative of the drop-out within the information reproduced form the storage medium, the output signal changing from a low level to a high level when the first pulse generation means supplies the first pulse signal with the high level to the logic gate means and the second pulse generation means supplies the second pulse signal with the high level to the logic gate mans for a time period exceeding the prescribed pulse duration, the output signal continuously having the low level when at least either the first pulse signal or the second pulse signal to be supplied to the logic gate means has the low level for a time period not exceeding the prescribed pulse duration, a first feedback means and a second feedback means, the first feedback means being provided for feeding the first pulse signal back to a first pulse duration setting terminal of the first pulse generation means to maintain a duty factor of the first pulse signal at a predetermined constant level, the second feedback means being provided for feeding the second pulse signal back to a second pulse duration setting terminal of the second pulse generation means to maintain a duty factor of the second pulse signal at a predetermined constant level, the output signal of said logic gate means having the high level constituting a drop-out detection signal for location the drop-out within the reproduced information.

2. A drop-out detection circuit as claimed in claim 1, wherein the first feedback means and the second feedback means includes a variable resistor, said variable resistor of the first feedback means and the second feedback means being adjusted to show a predetermined resistance that allows the duty factor of both the first pulse signal and the second pulse signal to be at a predetermined constant level, the respective variable resistor being coupled to both the first pulse duration setting terminal of the first pulse generation means and the second pulse duration setting terminal of the second pulse generation means.

3. A drop-out detection circuit as claimed in claim 1, wherein the first feedback means includes a first comparator and a first integrator, and the second feedback means comprises a second comparator and a second integrator, the first comparator and the first integrator being connected through an output terminal of the first pulse generation means to the first pulse duration setting terminal thereof, the second comparator and the second integrator being connected through an output terminal of the second pulse generation means to the second pulse duration setting terminal thereof, the aforesaid feedback means allowing the duty factor of both the first pulse signal and the second pulse signal to be maintained at a predetermined constant level.

4. A drop-out detection circuit as claimed in claim 3, wherein the first integrator smoothens the first pulse signal and supplies a first feedback signal to the first comparator, the first comparator comparing a voltage of the first feedback signal with a reference voltage to supply a first control signal to the first pulse duration setting terminal of the first pulse generation means, the first control signal allowing a duty factor of the first pulse signal to be maintained at a predetermined constant level, and wherein the second integrator smoothens the second pulse signal and supplies a second feedback signal to the second comparator, the second comparator comparing a voltage of the second feedback signal with the reference voltage to supply a second control signal to the second pulse duration setting terminal of the second pulse generation means, the second control signal allowing a duty factor of the second control signal to be maintained at a predetermined constant level.

5. A drop-out detection circuit as claimed in claim 3, wherein the first pulse generation means and the second pulse generation means are each made up of a monostable multivibrator which has an input terminal, an output terminal and a pulse duration setting terminal.

6. A drop-out detection circuit as claimed in claim 4 wherein said drop-out detection circuit further comprises a third comparator for generating the rectangular wave signal through waveform shaping of the modulated signal to supply the rectangular wave signal to the first pulse generation means and to the second pulse generation means.

* * * * *

UNITED STATES PATENT AND TRADEMARK OFFICE
CERTIFICATE OF CORRECTION

PATENT NO. : 5,117,193
DATED : May 26, 1992
INVENTOR(S) : HIROHISA YAMAGUCHI

It is certified that error appears in the above-identified patent and that said Letters Patent is hereby corrected as shown below:

CLAIM 1, Col. 8, Line 29, delete "mans" and substitute therefor --- means ---;  CLAIM 1, Col. 8, Line 48, delete "location" and substitute therefor --- locating ---;  CLAIM 3, Col. 8, Line 65, delete "comprises" and substitute therefor --- includes ---.

Signed and Sealed this

Twenty-fourth Day of August, 1993

Attest:

BRUCE LEHMAN

*Attesting Officer*  *Commissioner of Patents and Trademarks*